US012756675B2

(12) United States Patent
Prasad et al.

(10) Patent No.: US 12,756,675 B2
(45) Date of Patent: Oct. 6, 2026

(54) HIERARCHICAL MAPPING FOR NETWORK ON CHIP

(71) Applicant: Baya Systems, Inc., Santa Clara, CA (US)

(72) Inventors: Honnahuggi Harinath Venkata Naga Ambica Prasad, Bengaluru (IN); Narayana Sri Harsha Gade, Bangalore (IN); Eric Norige, Santa Clara, CA (US)

(73) Assignee: BAYA SYSTEMS, INC., Santa Clara, CA (US)

( * ) Notice: Subject to any disclaimer, the term of this patent is extended or adjusted under 35 U.S.C. 154(b) by 50 days.

(21) Appl. No.: 18/916,066

(22) Filed: Oct. 15, 2024

(65) Prior Publication Data

US 2026/0067234 A1 Mar. 5, 2026

(30) Foreign Application Priority Data

Sep. 2, 2024 (IN) ............................. 202411066301

(51) Int. Cl.
*H04L 49/25* (2022.01)
*H04L 49/109* (2022.01)

(52) U.S. Cl.
CPC ............ *H04L 49/25* (2013.01); *H04L 49/109* (2013.01)

(58) Field of Classification Search
CPC .............................. H04L 49/25; H04L 49/109
USPC .......................................................... 709/238
See application file for complete search history.

(56) References Cited

U.S. PATENT DOCUMENTS

2006/0104267 A1* 5/2006 Mondinelli ............. H04L 45/04 370/389
2013/0051397 A1* 2/2013 Guo ...................... H04L 45/586 370/400
2013/0136129 A1* 5/2013 Locatelli ................ H04L 45/58 370/392
2013/0182606 A1* 7/2013 So ....................... H04L 12/4641 370/254
2014/0281402 A1* 9/2014 Comparan ............ G06F 9/3842 712/214
2014/0301241 A1* 10/2014 Kumar .................. H04L 49/109 370/254
2015/0036536 A1* 2/2015 Kumar ................ H04L 41/0826 370/254
2015/0106778 A1* 4/2015 Mangano ............ G06F 13/4068 716/130
2015/0117223 A1* 4/2015 Lih ......................... H04L 45/06 370/258
2017/0063625 A1* 3/2017 Philip ................... H04L 45/302
(Continued)

*Primary Examiner* — Benjamin R Bruckart
(74) *Attorney, Agent, or Firm* — Procopio, Cory, Hargreaves & Savitch LLP

(57) ABSTRACT

Aspects of the present disclosure are directed to a method and a system for mapping flows of a Network-on-Chip (NoC). The method includes identifying hierarchically distinct flows across a plurality of instances of a sub-NoC, determining a unified route and Virtual Channel (VC) for each of the hierarchically distinct flows, and projecting the unified route and VC back to flow instances in each of the plurality of instances of the sub-NoC. By determining the unified route and VC for hierarchically distinct flows corresponding to flow instances of different instances of a sub-NoC, the method minimizes redundancy of mapping determination, and of resources during elaboration of NoC components.

6 Claims, 9 Drawing Sheets

(56) References Cited

U.S. PATENT DOCUMENTS

| | | | | |
|---|---|---|---|---|
| 2020/0234396 A1* | 7/2020 | Qi | ........................ | G06F 12/0207 |
| 2021/0168038 A1* | 6/2021 | Gade | ...................... | H04B 1/583 |
| 2025/0174294 A1* | 5/2025 | Van Ruymbeke | ...... | G06F 30/33 |

* cited by examiner

600

HIERARCHICAL MAPPING FOR NETWORK ON CHIP

CROSS-REFERENCE TO RELATED APPLICATIONS

This application claims priority to IN 202411066301, filed on Sep. 2, 2024, the contents of which are incorporated herein by reference.

BACKGROUND

Technical Field

Methods and example embodiments described herein are generally directed to construction of Network on Chip (NoC), and more specifically, to hierarchy-aware mapping of NoCs.

Related Art

The number of components on a chip is rapidly growing due to increasing levels of integration, system complexity, and shrinking transistor geometry. Complex System-on-Chips (SoCs) may involve a variety of components e.g., processor cores, Digital Signal Processors (DSPs), hardware accelerators, memory, and Input/Output (I/O) interfaces, while Chip Multi-Processors (CMPs) may involve a large number of homogenous processor cores, memory, and I/O subsystems. In both systems, the on-chip interconnect plays a key role in providing high-performance communication between the various components. Due to scalability limitations of traditional buses and crossbar-based interconnects, Network-on-Chip (NoC) has emerged as a paradigm to interconnect a large number of components on the chip.

The NoC is a global shared communication infrastructure made up of several routing nodes interconnected with each other using point-to-point physical links. Messages are injected by source components and are routed from the source router/nodes to a destination router/node over multiple intermediate nodes and physical links. The destination router/node then ejects the message to the destination component. For the remainder of the document, the terms 'processing elements,' 'components,' 'endpoints,' 'blocks,' 'hosts,' or 'cores,' will be used interchangeably to refer to the various system components that are interconnected using a NoC. The terms "routers' and 'nodes' will also be used interchangeably. Without loss of generalization, the system with multiple interconnected components will itself be referred to as a 'multi-core system'.

There are several possible topologies in which the routers can connect to one another to create the system network. Bi-directional rings 100A (as shown in FIG. 1A) and 2-D mesh 100B (as shown in FIG. 1B) are examples of topologies in the related art.

Packets are message transport units for intercommunication between various components. Routing involves identifying a path, which is a set of routers and physical links of the network over which packets are sent from a source component to a destination component. Components are connected to one or multiple ports of one or multiple routers; with each such port having a unique identifier (ID). Packets carry the destination's router and port ID for use by the intermediate routers to route the packet to the destination component.

Examples of routing techniques include deterministic routing, which involves choosing the same path from component A to component B for every packet. This form of routing is oblivious to the state of the network and does not load balance across path diversities which may exist in the underlying network. However, such deterministic routing may be simple to implement in hardware, maintains packet ordering, and may be easy to make free of network-level deadlocks. Shortest path routing minimizes the latency as it reduces the number of hops from the source to the destination. For this reason, the shortest path is also the lowest power path for communication between the two components. Dimension-order routing is a form of deterministic shortest-path routing in 2D mesh networks.

FIG. 2 illustrates an example of XY routing in a two-dimensional mesh 200. More specifically, FIG. 2 illustrates XY routing from node '34' to node '00'. In the example of FIG. 2, each component is connected to only one port of one router. A packet is first routed in the X dimension till the packet reaches node '04' where the X dimension is same as the destination. The packet is next routed in the Y dimension until the packet reaches the destination node.

Source routing and routing using tables are other routing options used in NoC. Adaptive routing can dynamically change the path taken between two points on the network based on the state of the network. This form of routing may be complex to analyze and implement and is therefore rarely used in practice.

The NoC may contain multiple physical networks. Over each physical network, there may exist multiple virtual networks, where different message types are transmitted over different virtual networks. In this case, at each physical link or channel, there are multiple virtual channels (VCs), each VC may have dedicated buffers at both endpoints. In any given clock cycle, only one VC can transmit data on the physical channel.

NoC interconnects often employ wormhole routing, where a large message or packet is broken into small pieces known as flits (also referred to as flow control units). The first flit is the header flit which holds information about the packet's route and key message level information along with payload data and sets up the routing behavior for all subsequent flits associated with the message. Zero or more body flits follow the head flit, containing the remaining payload of data. The final flit is a tail flit which in addition to containing the last payload also performs some bookkeeping to close the connection for the message. In wormhole flow control, VCs are often implemented.

The physical channels are time-sliced into a number of independent logical channels, i.e. VCs. VCs provide multiple independent paths to route packets; however, they are time-multiplexed on the physical channels. A VC holds the state needed to coordinate the handling of the flits of a packet over a channel. At a minimum, this state identifies the output channel of the current node for the next hop of the route and the state of the virtual channel (idle, waiting for resources, or active). The VC may also include pointers to the flits of the packet that are buffered on the current node and the number of flit buffers available on the next node.

The term "wormhole" refers to the way messages are transmitted over the channels. The output port at the next router can be so short that received data can be translated in the head flit before the full message arrives. This allows the router to quickly set up the route upon arrival of the head flit and then opt-out from the rest of the conversation. Since a message is transmitted flit by flit, the message may occupy several flit buffers along its path at different routers, creating a worm-like image.

Based on the traffic between various endpoints, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies. However, all channels are equal in width or number of physical wires. This width can be determined based on the most loaded channel and the clock frequency of various channels.

SUMMARY

Aspects of the present disclosure are directed to a method for mapping flows of a Network-on-Chip (NoC). The method includes identifying hierarchically distinct flows across a plurality of instances of a sub-NoC, determining a unified route and Virtual Channel (VC) for each of the hierarchically distinct flows, and projecting the unified route and VC back to flow instances in each of the plurality of instances of the sub-NoC.

Other aspects of the present disclosure are directed to a system for mapping flows of a NoC. The system includes a control module configured to identify hierarchically distinct flows across a plurality of instances of a sub-NoC, determine a unified route and VC for each of the hierarchically distinct flows, and project the unified route and VC back to flow instances in each of the plurality of instances of the sub-NoC.

Further aspects of the present disclosure are directed to a non-transitory computer readable medium storing instruction to identify hierarchically distinct flows across a plurality of instances of a sub-NoC, determine a unified route and VC for each of the hierarchically distinct flows, and project the unified route and VC back to flow instances in each of the plurality of instances of the sub-NoC.

DETAILED DESCRIPTION

The design and construction of Network-on-Chips (NoCs) includes several processes, including the process of mapping paths/routes to different (traffic) flows. Once the topology of the NoC and traffic flows between different hosts (such as of a multi-core system) are determined, paths/mappings through the NoC may be identified for each traffic flow. The traffic flows may be mapped to a route and a Virtual Channel (VC) through which packets may be transported. Existing processes for mapping typically include identifying a path/route for each traffic flow between two hosts, selecting a VC, and adding the route and the VC to the mappings based on correctness of the route and the VC, such as when the route and VC are not susceptible to deadlocks.

In existing methods, the mapping for each traffic flow is identified from flattened topologies of the NoC, even when the NoC includes multiple instances/instantiations of one or more sub-NoCs/sub-NoC designs. When using flattened topologies, hierarchies of multiple instantiations of different sub-NoCs that form the NoC are ignored, which increases the likelihood of generating redundant mappings, as described in reference to schematic representation 300 of FIG. 3.

Figure 1A:
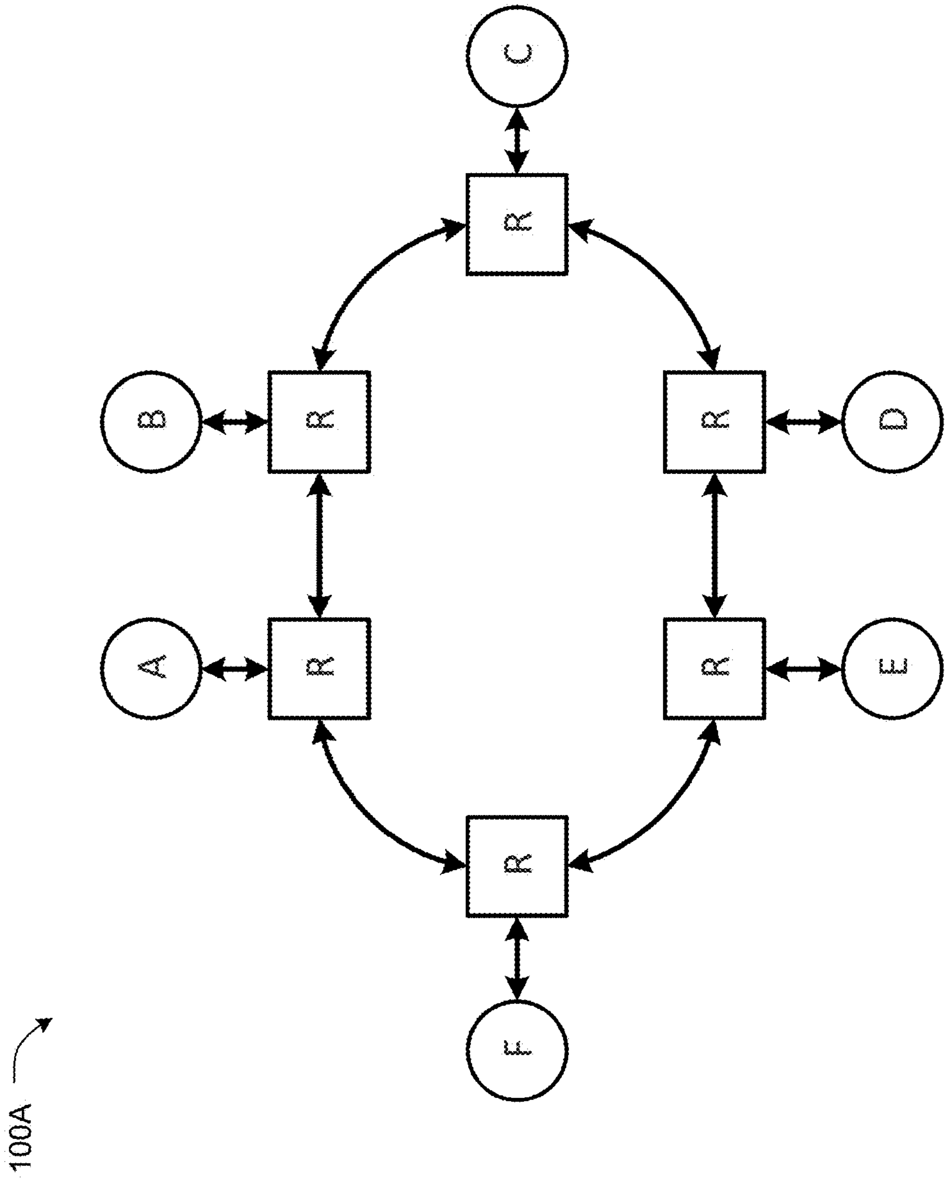
FIGS. 1A and 1B illustrate examples of bidirectional ring and two-dimensional (2D) Mesh Network on Chip (NoC) topologies.
Figure 1B:
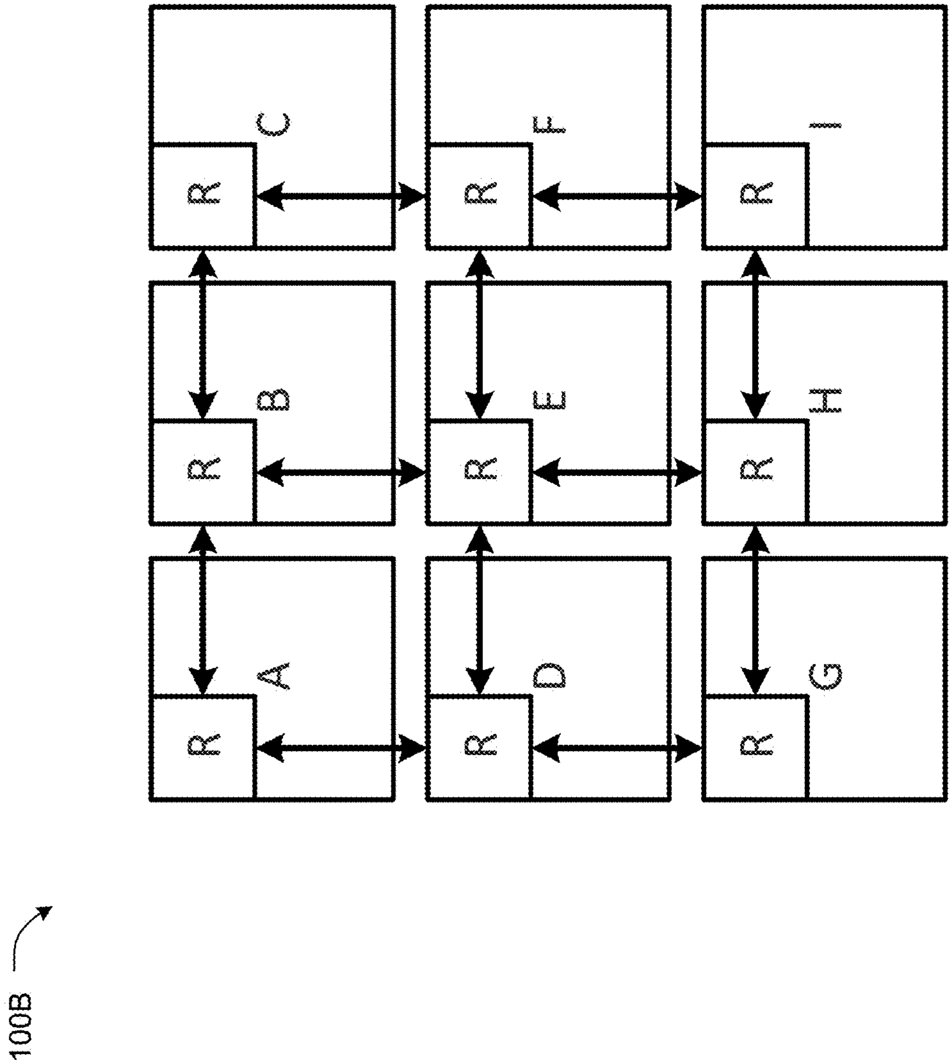
Figure 2:
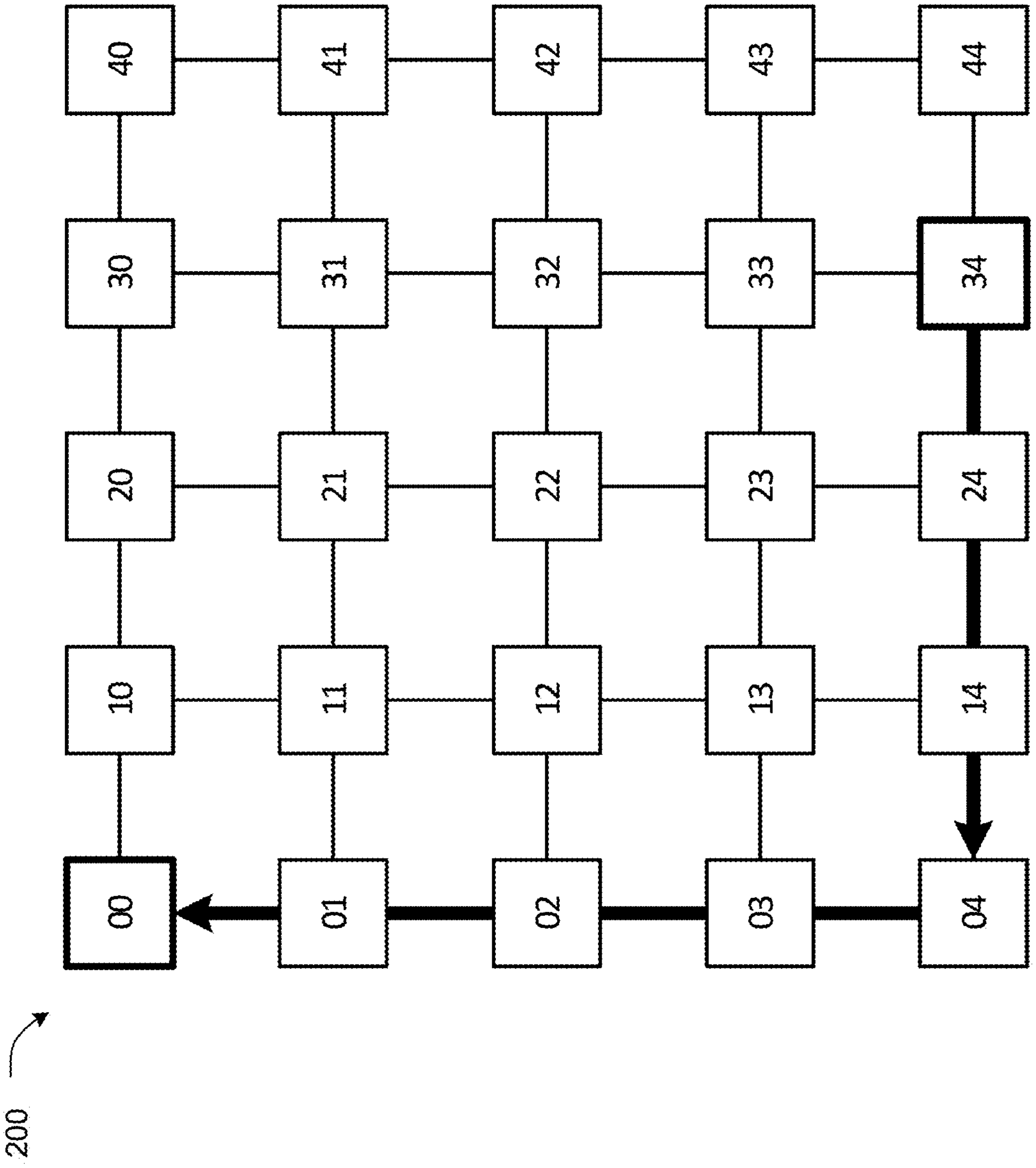
FIG. 2 illustrates an example of XY routing in a NoC having a two-dimensional mesh topology.
Figure 3:
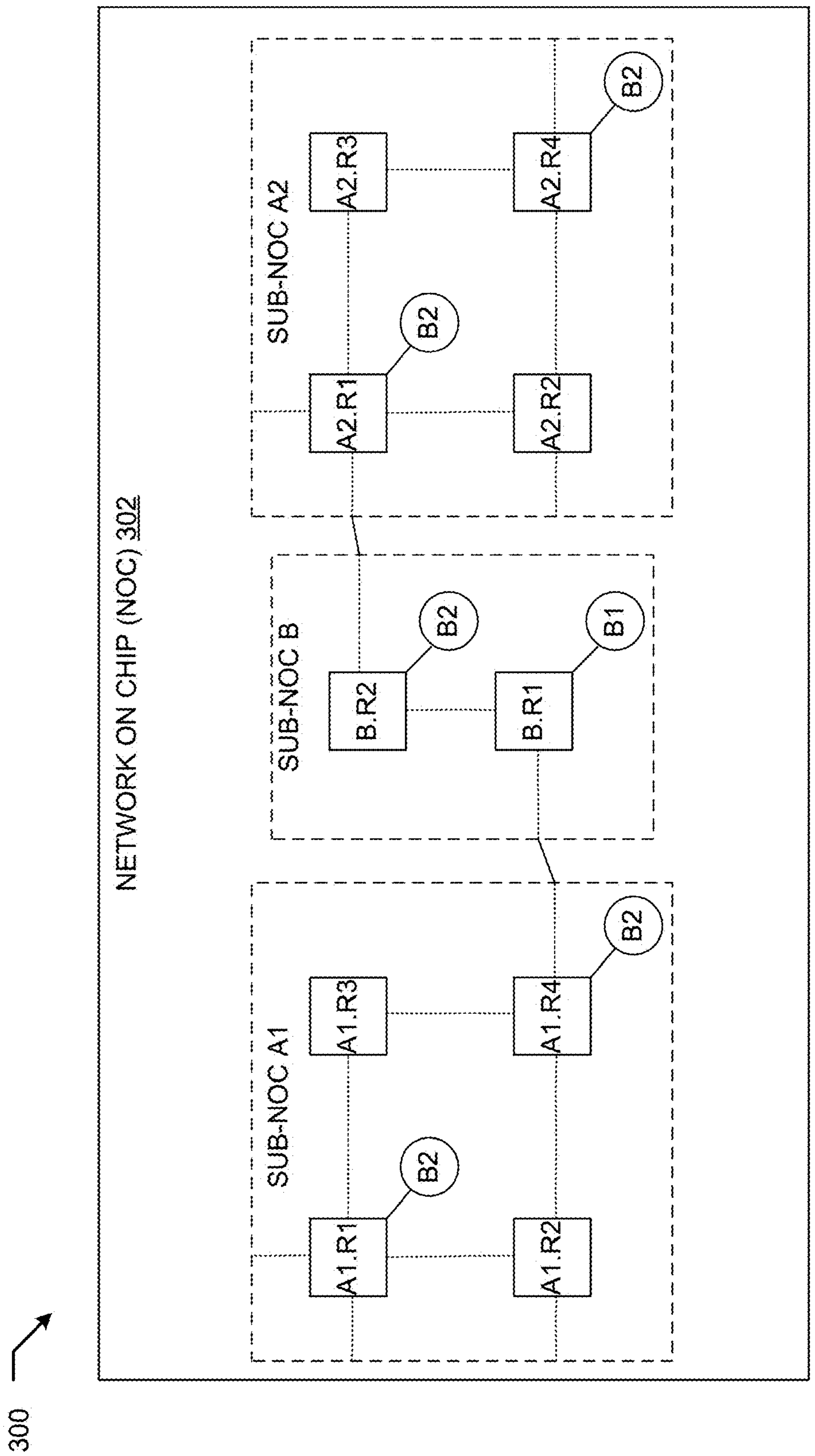
FIG. 3 illustrates a schematic representation of a NoC having multiple instances/instantiations of a sub-NoC, in accordance with an example implementation.

Referring to FIG. 3, a NoC 302 may include one or more instances of multiple sub-NoCs (such as two instances of sub-NoC design A, and one instance of sub-NoC design B). Each sub-NoC may include a set of NoC components (such as routers, bridges, and the like) arranged in a predetermined manner adhering to any design pattern. Examples of design patterns include 'a sub-NoC design pattern' where routers at a boundary of the sub-NoC are exposed for connection with other sub-NoCs, 'a cluster design pattern' where the sub-NoCs are exposed for connection with other sub-NoCs through a set of boundary bridges, and 'a NoC top design pattern' where the sub-NoCs are not exposed for connection with other sub-NoCs or NoC components. For example, the sub-NoCs A1, A3, and B may adhere to the sub-NoC design pattern. The sub-NoC A1 and A2 may be different instances/instantiations of 'sub-NoC design A,' as shown in representation 500 of FIG. 5. The sub-NoC design A may include routers A.R1 to A.R4, which may be arranged in a grid layout. Further, the sub-NoC design A may include bridges B1 and B2 connected to routers A.R1 and A.R4, respectively. The bridges B1 and B2 may enable interfacing with the corresponding hosts. As shown, the NoC components of the sub-NoCs A1 and A2 are referred to along with an instance identifier (i.e. A1 and A2 respectively). Further, the NoC 302 may also include other sub-NoC designs, such as the sub-NoC B having routers B.R1 and B.R2 connected to corresponding bridges B1 and B2 respectively.

In some embodiments, each sub-NoC may be formed using other sub-NoCs, thereby forming a hierarchy of sub-NoCs. For example, a larger sub-NoC may be composed of multiple smaller sub-NoCs. The sub-NoCs may allow for multi-instancing, where multiple instances of the same sub-NoC/sub-NoC design may be used to build the NoC topology. Further, using a set of predefined sub-NoC designs to build the NoC 302 may provide modularity in the design phase, thereby allowing users/designers of the NoC to easily scale/expand and or add additional functionality to the NoC 302 in a modular manner. Additionally, the sub-NoC designs may be developed independently, and may be used as black-boxes when arranging different sub-NoC designs for building the hierarchical topologies of the NoC 302. For example, sub-NoC designs A and B may be independently built, and instantiated such that the sub-NoC instance A1 exchanges packets with sub-NoC instance A2 through sub-NoC instance B. The sub-NoC instances may be arranged based on boundary ports that each of the sub-NoC exposes to other sub-NoCs. Such multi-instancing of sub-NoC designs to build the NoC 302 may also complement multi-instancing techniques used in development and construction of multi-core systems.

However, as stated, existing methods for mapping traffic flows of the NoC 302 use flattened topologies, i.e., by disregarding that the NoC 302 includes multiple instantiations of one or more of the sub-NoC designs. Identifying mappings (i.e. the routes and VCs for the flows) from flattened topologies increases redundancy (since mappings for similar/identical traffic flows through different instances of the same sub-NoC are determined independently). For example, since existing solutions disregard the fact that sub-NoC A1 and A2 have the same design, mappings for a first traffic flow between hosts associated with routers A1.R1 and A1.R4, and mappings for a second traffic flow between hosts associated with routers A2.R1 and A2.R4 may be determined separately/independently.

Figure 5:
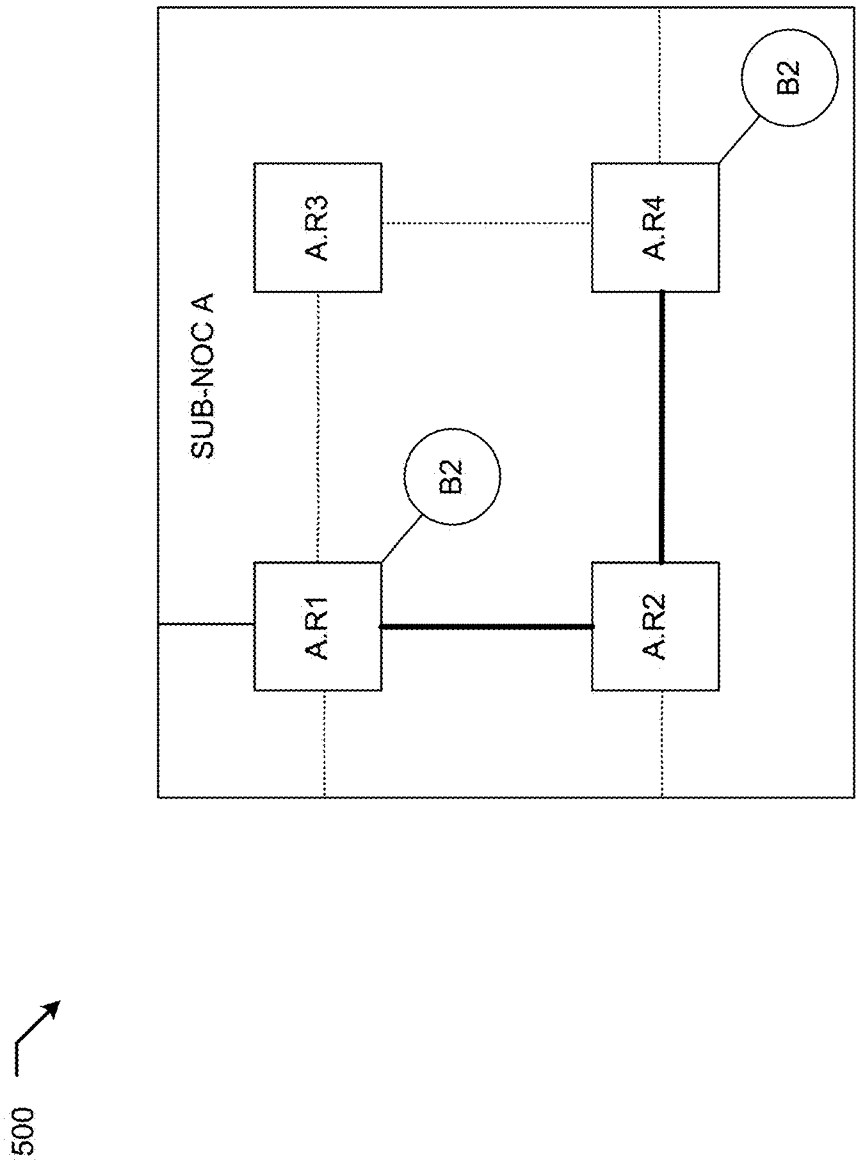
FIG. 5 illustrates an example representation of the unified route and VC determined for a hierarchically distinct flow associated with a sub-NoC, in accordance with an example implementation.

However, since the sub-NoCs A1 and A2 are instances of the same sub-NoC design (i.e. sub-NoC A), a similar set of mappings may be determined for both the first and the second traffic flow. For example, the first traffic/instance flow between two hosts may require a path from router A1.R1 to router A1.R4 through A1.R2 for sub-NoC instance A1, and correspondingly the second traffic/instance flow between similarly located hosts may require a path from router A2.R1 to router A2.R4 through router A2.R2 for sub-NoC instance A2, assuming the packets are injected into and are ejected from the sub-NoC instances through bridges associated with the corresponding hosts. In such examples, when the first and the second traffic flows of the sub-NoC instances A1 and A2 (as shown in FIG. 3) are overlayed on the sub-NoC design A (as shown in FIG. 5), it may be appreciated that the first and the second traffic flows correspond to the same traffic flow or a 'hierarchically distinct flow' (i.e. a flow between two hosts associated with the sub-NoC design, such as the hosts associated with routers A.R1 and A.R4 in the example shown in FIGS. 3 and 5). Since existing methods ignore the fact that the first and the second traffic/instance flows are identical when using the flattened topology, existing methods redundantly determine the mappings for such flows at each instance of the sub-NoCs.

Further, the redundant determination of the mappings may also yield different routes and/or VCs being determined for similar traffic flows. For example, existing methods may identify a first route between router A1.R1 and router A1.R4 through router A1.R2 for the sub-NoC instance A1, and a second route between router A2.R1 and router A2.R4 through router A1.R3 for sub-NoC instance A2. Further, different VCs (not shown) may also be identified for each of the routes, based on position of the sub-NoC instance in relation to other neighboring sub-NoCs. Having multiple mappings for similar/identical flows increases the cost of constructing the NoC 302, as each of the sub-NoCs may have to be elaborated in a manner that supports the multiple mappings. For example, the sub-NoC A may be elaborated such that router A.R1 includes output ports in southern direction (to support the first route) and in eastern direction (to support the second route) for the hierarchically distinct flow of the sub-NoC design A. Correspondingly, the router A.R4 may require additional input ports to receive packets from western and northern direction. Further, when mappings for different instances of the same sub-NoC are identified independently, different VCs for the same routes may be identified.

Hence, existing methods require additional resources to be configured on each of the NoC components when elaborated based on the multiple mappings determined for each of the traffic flows/instance flows. Configuring additional resources such as input/output ports and/or different VCs requires additional VC buffers, output registers, credit handling means, configuration of logic for arbitration, internal wirings, routing tables (with additional strap bits to distinguish between different sub-NoC instances) and the like, add to the cost of the NoC 302. Additionally, having multiple mappings for similar/identical traffic flows in different instances of the same sub-NoC design may also increase cost and time required for hardware simulation/verification.

The present disclosure provides a method 400, and a system having a control module implementing the method 400, that removes redundancy in determining mappings for different traffic flows of the NoC (such as NoC 302) that have multiple instances of one or more of the sub-NoC designs.

Figure 4A:
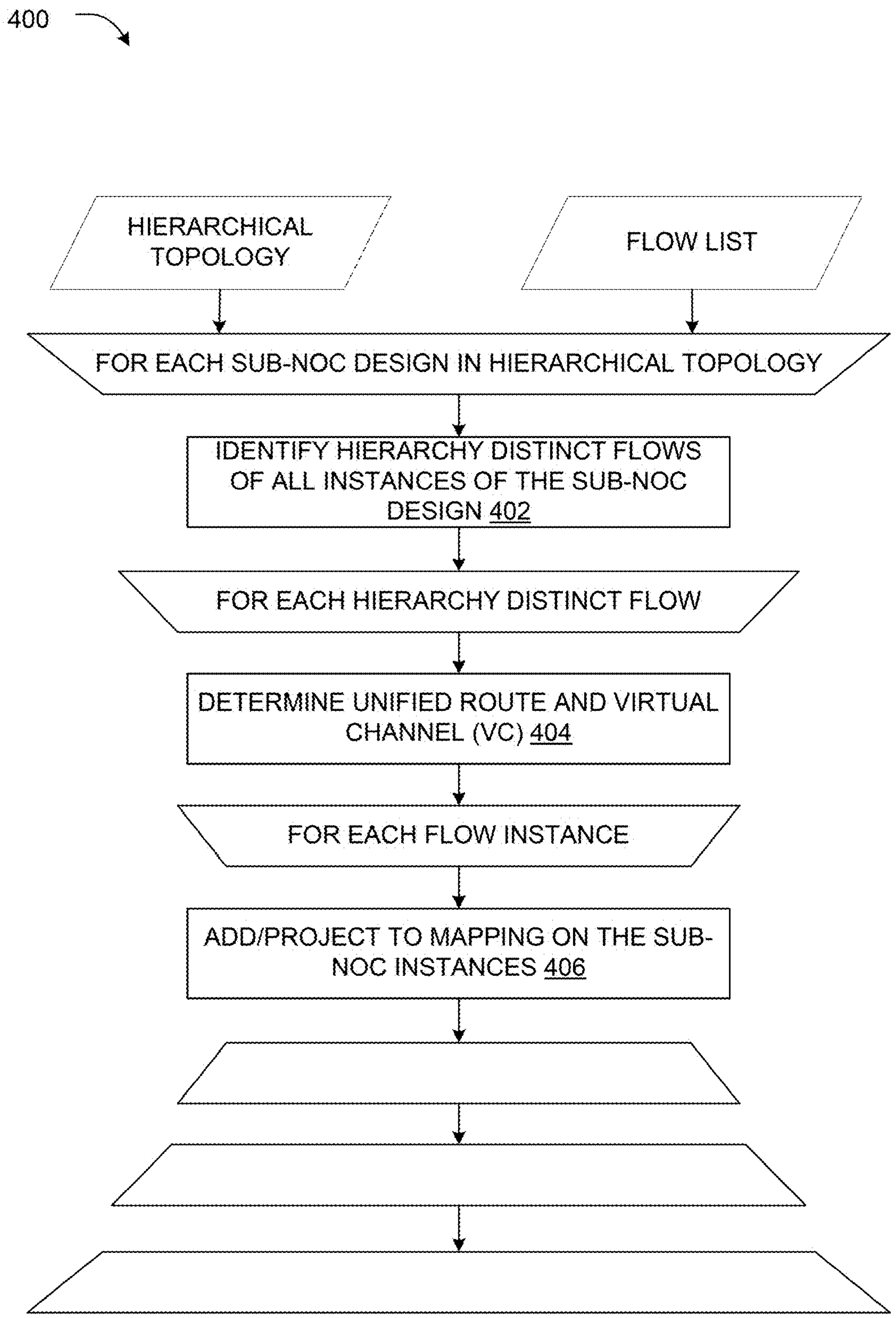
FIG. 4A illustrates a flowchart of an example method for mapping flows of a NoC having a hierarchy of sub-NoCs, in accordance with an example implementation.

Referring to FIG. 4A, the method 400 may include steps 402 to 406. The method 400 may be configured to use a hierarchical topology (i.e. topology of the NoC 302 built using multiple instances of different sub-NoC arranged in a hierarchy), and a flow list having traffic/instance flows between any two or more hosts associated with the NoC 302. For each sub-NoC design used in the hierarchy, the method 400 may include iterating steps 402 and 404.

At step 402, the method 400 includes identifying hierarchically distinct flows across a plurality of instances of the sub-NoC designs. The hierarchically distinct flows may be overlapping/flow instances associated with each instance of the sub-NoC designs. The hierarchically distinct flows may be identified by grouping flow instances associated with each instance of the sub-NoC design from the flow list. For example, the first traffic flow between router A1.R1 and router A1.R4 and the second traffic flow between router A2.R1 and router A2.R4, may be grouped and identified as the same hierarchically distinct flow, i.e. a flow between router A.R1 and router A.R4 as both the traffic flows are associated with instances of the same sub-NoC design (i.e. sub-NoC design A). The method 400 may be configured to iterate step 404 for each of the hierarchically distinct flows identified for each sub-NoC design.

Figure 4B:
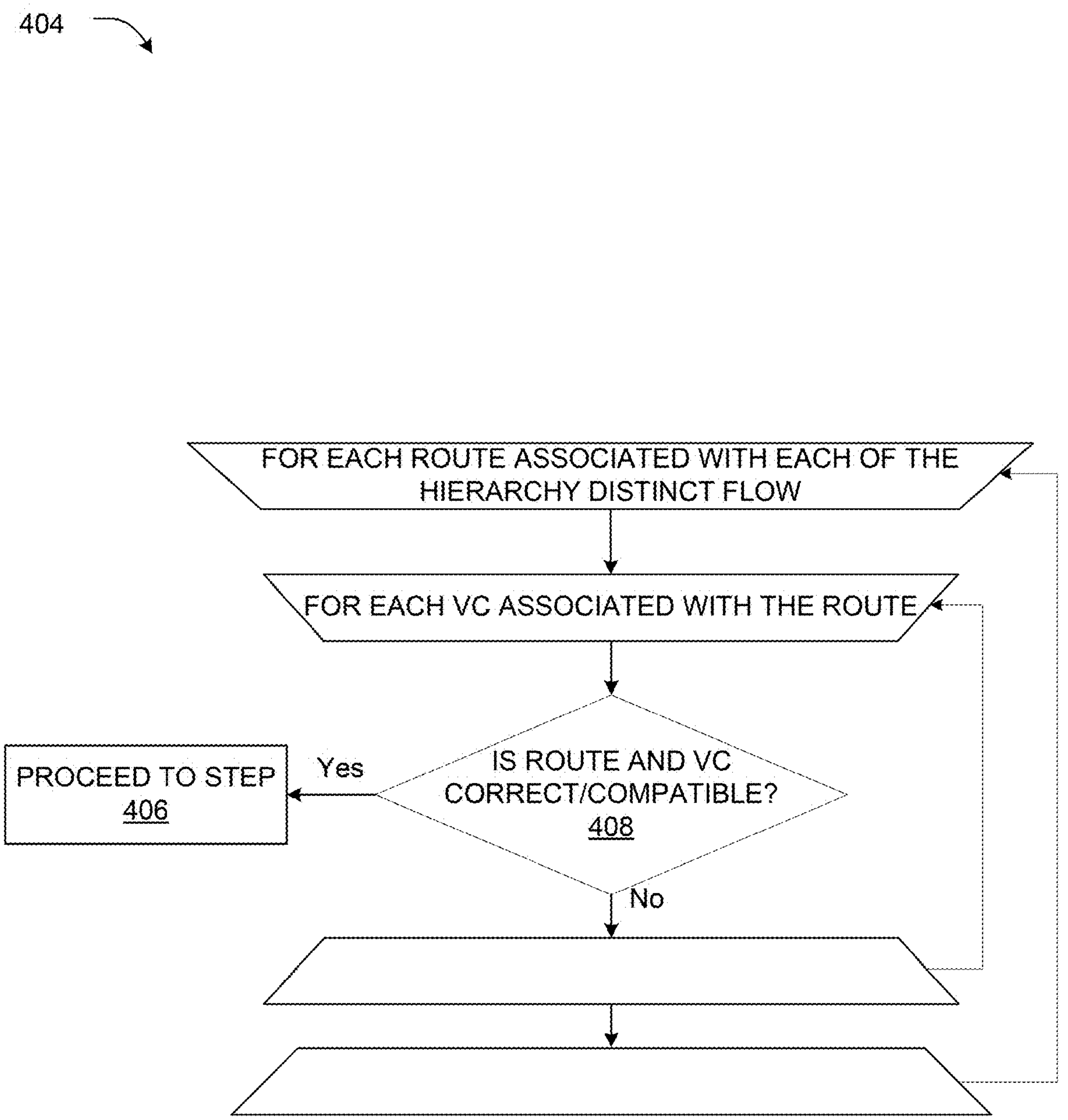
FIG. 4B illustrates a flowchart of an example method for determining a unified route and VC for each sub-NoC, in accordance with an example implementation.

At step 404, the method 400 includes determining a unified route and VC for each of the hierarchically distinct flows. In some embodiments, to determine the unified route and the VC, the method 400 may iterate step 408, as shown in FIG. 4B. For each (possible) route associated with each hierarchically distinct flow, and for each available VC of the possible route, the method 400 may include determining if the possible route and the available VC are correct/compatible at step 408. The route and the VC may be checked for correctness, such as whether they cause any deadlocks in the NoC 302, for example. If the route and the VC are not correct/compatible with the NoC topology, the step 408 is iterated using the next VC available for the route. If no compatible VC is found, then the step 408 is iterated for the available VCs for the next route. If no compatible VC for any other possible routes is found, then the mapping process is halted. If any pair of route and VC is found to be correct/compatible, the method 400 proceeds to step 406, and the iteration stops. In the example shown in FIG. 5, each possible route may be identified for the hierarchically distinct flow (i.e. a flow from router A.R1 to router A.R4). For example, the possible routes may include a first route through A.R2 (i.e. A.R1→A.R2→A.R4), and a second route through A.R3 (i.e. A.R1→A.R3→A.R4). The method 400 includes iterating through the first and the second routes (and the VCs thereof), and when the first correct route and VC are identified, the method 400 proceeds to step 406. In the foregoing example, the route is determined to be the first route through the router A.R2.

Figure 6:
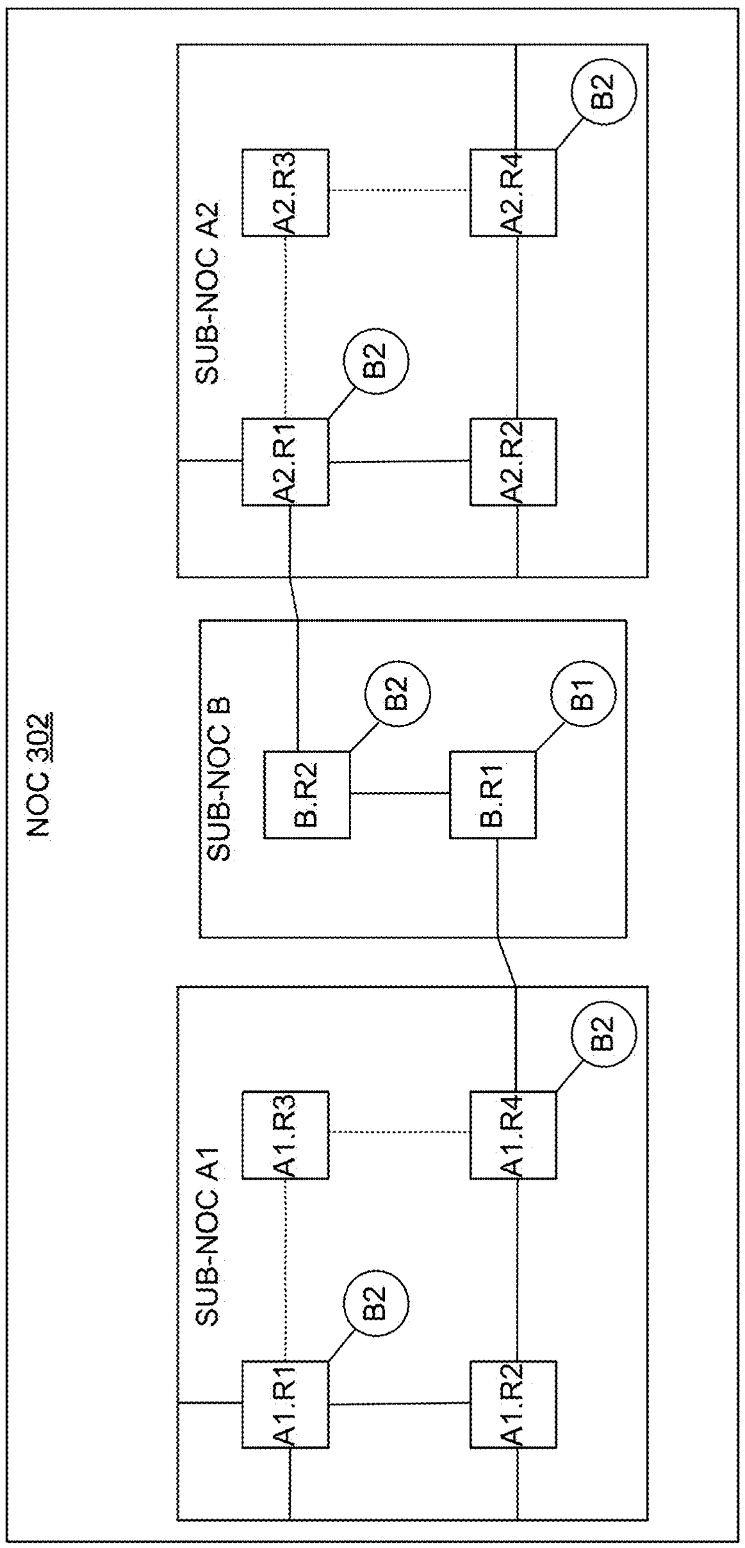
FIG. 6 illustrates an example representation of the unified routes and VCs of the hierarchically distinct flows being projected to each flow instance of sub-NoC instances, in accordance with an example implementation.

At step 406, the method 400 includes adding/projecting the unified route and VC back to flow instances in each of the plurality of instances of the sub-NoC. For example, the unified route and VC may be projected back to the flow instances, as shown in reference to representation 600 shown in FIG. 6. In such embodiments, each instance of the sub-NoC design may be configured to have the unified route and VC for the corresponding traffic flow/flow instance. Once the mappings for each flow from the flow list are identified, the NoC components may be elaborated based on the unified route and VC.

In the foregoing example where the first route is selected, for each of the sub-NoC instances of sub-NoC design A, the router A.R1 may be elaborated to include at least a south output port to eject packets to router A.R2, the router A.R2 may include a north input port for receiving the packet from router A.R1 and an east output port to eject the packet to router A.R4, and the router A.R4 may include a west input port to receive the packet from the router A.R2. Additionally, the routers A.R1, A.R2, and A.R4 may be suitably configured to support the unified VC. Such routers may include corresponding VC buffers, internal wiring, arbitration logic, and the like, to support the unified route and VC at each instance of the sub-NoC design to support the corresponding flow instance. Since only one route and VC are determined and implemented for each hierarchically distinct flow of the sub-NoC design, each instance of the sub-NoC may be configured with only one routing table, thereby providing savings in cost and area. Further, although the router A.R3 may not be elaborated to include any input or output ports for the foregoing hierarchically distinct flow, it may be appreciated by those skilled in the art that the router A.R3 may be suitably elaborated based on other hierarchically distinct flows that include the router A.R3 in a route thereof, which are not shown in the FIG. 6 for the purposes of clarity.

In some embodiments, as described above, the flow instances/traffic flows in the flow list may include flows where both transmitting hosts and receiving hosts are associated with the same instance of the sub-NoC design. In other embodiments, the flow list may include global flows, which may be indicative of flows between hosts associated with different sub-NoC instances, such as between hosts associated with router A1.R1 of the sub-NoC instance A1 and router A2.R4 of sub-NoC instance A2. In such embodiments, the global flows may be split into multiple partial flows, where each partial flow represents a flow instance/traffic flow to transport packets from a first NoC component to a second NoC component within the corresponding sub-NoC instance. In other words, the instance flows may be incorporated as a part of the global flows.

For example, the global flow between hosts associated with the router A1.R1 and router A2.R4 may be split into three partial flows, viz. a first partial flow from router A1.R1 to boundary port at router A1.R4 exposed to router B.R1, a second partial flow from router B.R1 to boundary port associated with router B.R2 exposed to A2.R1, and a third partial flow from router A2.R1 to router A2.R4. Since each of the partial flows correspond to flow instances/traffic flows associated with the sub-NoC instances, the partial flows may be generalized to hierarchically distinct flows for the corresponding sub-NoC design. In such embodiments, the method 400 may be adapted to generate and project the unified route and VC for the hierarchically distinct flows corresponding to each of the partial flows, thereby allowing mappings to be generated for inter-sub-NoC traffic flows without redundancy. To support the global flow, a source sub-NoC instance (such as sub-NoC instance A1) may be configured to receive the packets at a source NoC component thereof from the source host, and transport the packets to a boundary port of the source sub-NoC instance through the unified route and VC. The packets may be ejected towards other sub-NoC instances (such as sub-NoC instance B) from the boundary port. The other sub-NoC instances may further transport the packets towards a destination sub-NoC instance (such as sub-NoC instance A2). On receiving the packet, the destination sub-NoC instance may transport the packet to the destination host, through the unified route and VC.

In some embodiments, the method 400 may include determining a flow bundle route for a set of hierarchically distinct flows, and determining corresponding VCs for each hierarchically distinct flow from the set of hierarchically distinct flows. The set of hierarchically distinct flows may correspond to a bundle of different flow instances/traffic flows grouped based on a predetermined set of parameters. For example, the NoC 302 may be configured to use different VCs for different traffic classes between two hosts. The flow list/traffic specification may include distinct flows for each traffic class between two or more hosts. Such flows may be identified, grouped, and represented as the set/bundle of hierarchically distinct flows. The method 400 may be adapted to determine the flow bundle route for the set of hierarchically distinct flows, where the flow bundle route may correspond to the unified route for the set of hierarchically distinct flows. Further, the method 400 may be configured to determine different VCs for each hierarchically distinct flow in the set of hierarchically distinct flows, corresponding to each traffic class, for example. The flow bundle routes and the corresponding VC for each hierarchically distinct flow in the set may be projected back to each instance of the sub-NoC designs.

By identifying the unified routes and VCs for each hierarchically distinct flow associated with the sub-NoC design, and projecting the unified routes and VCs to each instance of the sub-NoC design, the method 400 allows for removal of redundant determination of mappings for similar flow instances/traffic flows, thereby reducing mapping runtime and also reducing costs as the NoC components of the sub-NoC design may be elaborated with fewer resources (such as with smaller routing tables, smaller number of input and output ports, reduced complexity for arbitration, and the like). Generating mappings based on the hierarchy of the NoC may improve turnaround time of hardware design and construction, reduce sizes of routing tables, and allow for greater flexibility in choosing sub-NoC designs for building the NoC topology.

The method 400 may allow the traffic flows of the sub-NoCs to be mapped at any granularity, i.e. sub-NoCs at any level of the hierarchy may be chosen for the mapping process. Such granularity may allow the mappings to be optimized for area and/or performance, based on area sensitivity and/or performance sensitivity of NoC 302. For example, a bottoms-up mapping (i.e. identifying mappings from smaller sub-NoC designs to larger sub-NoC designs) may reduce the size and cost of the NoC components of each instance of the sub-NoC design, thereby allowing for area optimization. A top-down approach (i.e. identifying mappings from larger sub-NoCs) may allow for optimization of performance. In such examples, since using the same routes and VCs for some of the sub-NoC instances may not necessarily be optimal for performance, different mappings may be generated therefor.

Further, the method 400, by determining mappings at the sub-NoC level, may enable the NoC to be more efficiently scalable. For example, a sub-NoC implementing a NoC topology design pattern for a 4-core system may be conveniently expanded for 8-core systems by allowing users/designers to instantiate the sub-NoC twice, without requiring redundant generation and verification of mappings. The savings in cost and development time may become more apparent as the complexity and scale of the NoC increase.

Figure 7:
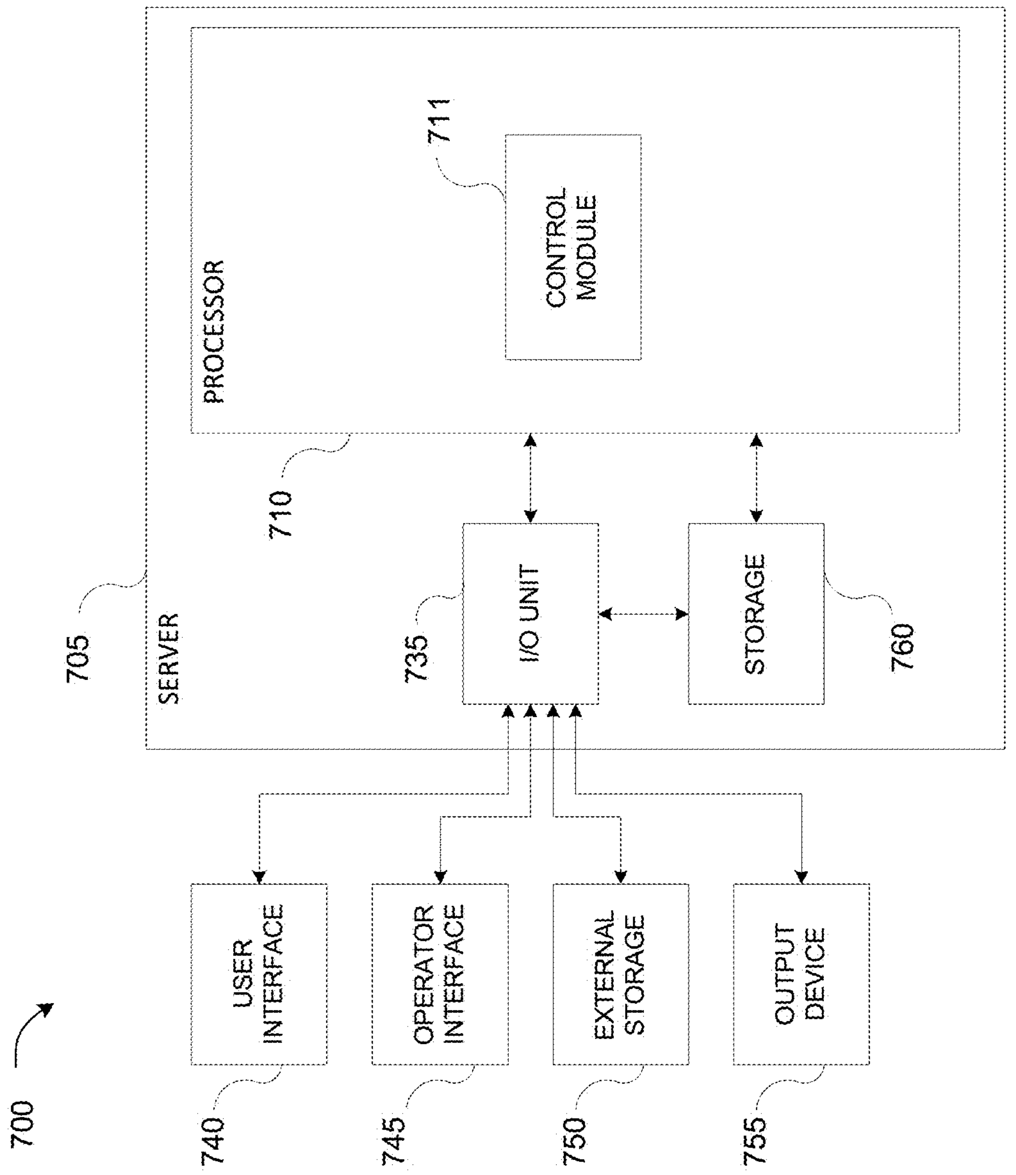
FIG. 7 illustrates an example computer/server block diagram upon which the example implementations described herein may be implemented.

The method 400 and the system of the present disclosure may be implemented in a computer system. FIG. 7 illustrates an example computer system 700 on which example embodiments may be implemented. The computer system 700 includes a server 705 which may include an I/O unit 735, storage 760, and a processor 710 operable to execute one or more units as known to one of skill in the art. The term "computer-readable medium" as used herein refers to any medium that participates in providing instructions to processor 710 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The Input/Output (I/O) unit 735 processes input from user interfaces 740 and operator interfaces 745 which may utilize input devices such as a keyboard, mouse, touch device, or verbal command.

The server 705 may also be connected to an external storage 750, which can contain removable storage such as a portable hard drive, optical media (CD or DVD), disk media, or any other medium from which a computer can read executable code. The server may also be connected to an output device 755, such as a display to output data and other information to a user, as well as request additional information from a user. The connections from the server 705 to the user interface 740, the operator interface 745, the external storage 750, and the output device 755 may be via wireless protocols, such as the 802.11 standards, Bluetooth® or cellular protocols, or via physical transmission media, such as cables or fiber optics. The output device 755 may therefore further act as an input device for interacting with a user. The processor 710 may be configured to execute a control module 711. The control module 711 may be configured to implement the method 400 for constructing NoCs, among performing other functions.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A method for mapping flows of a Network-on-Chip (NoC), comprising:

for an input of a hierarchical topology comprising a topology of the NoC as built using multiple instances of different sub-NoC designs arranged in a hierarchy, each of the different sub-NoCs designs comprising routers and bridges interconnected in a predetermined manner, and a flow list comprising traffic or instance flows between any host pair associated with the NoC:

for each of the different sub-NoC designs in the hierarchical topology, identifying hierarchically distinct flows across a plurality of instances of the each of the different sub-NoC designs through grouping, from the flow list, flow instances associated with each of the plurality of instances of the each of the different sub-NoC designs;

determining a unified route and Virtual Channel (VC) for each of the hierarchically distinct flows; and projecting the unified route and VC back to paths through each of the plurality of instances of the each of the different sub-NoC designs.

2. The method of claim 1, wherein determining the unified route and VC for each of the hierarchically distinct flows comprises:

determining a single flow bundle route for a set/bundle of hierarchically distinct flows, wherein the hierarchically distinct flows associated with each traffic class between two or more hosts are grouped into the set/bundle of hierarchically distinct flows; and determining a corresponding VC for each of hierarchically distinct flow in the set/bundle of hierarchically distinct flows.

3. A system comprising a control module, configured to:

for an input of a hierarchical topology comprising a topology of the NoC as built using multiple instances of different sub-NoC designs arranged in a hierarchy, each of the different sub-NoCs designs comprising routers and bridges interconnected in a predetermined manner, and a flow list comprising traffic or instance flows between any host pair associated with the NoC:

for each of the different sub-NoC designs in the hierarchical topology, identify hierarchically distinct flows across a plurality of instances of the each of the different sub-NoC designs through grouping, from the flow list, flow instances associated with each of the plurality of instances of the each of the different sub-NoC designs;

determine a unified route and Virtual Channel (VC) for each of the hierarchically distinct flows; and project the unified route and VC back to paths through each of the plurality of instances of the each of the different sub-NoC designs.

4. The system of claim 3, wherein to determine the unified route and VC for each of the hierarchically distinct flows, the control module is configured to:

determine a single flow bundle route for a set/bundle of hierarchically distinct flows, wherein the hierarchically distinct flows associated with each traffic class between two or more hosts are grouped into the set/bundle of hierarchically distinct flows; and determine a corresponding VC for each of hierarchically distinct flow in the set/bundle of hierarchically distinct flows.

5. A non-transitory computer-readable medium storing instructions for mapping flows of a Network on Chip (NoC), the instructions comprising:

for an input of a hierarchical topology comprising a topology of the NoC as built using multiple instances of different sub-NoC designs arranged in a hierarchy, each of the different sub-NoCs designs comprising routers and bridges interconnected in a predetermined manner, and a flow list comprising traffic or instance flows between any host pair associated with the NoC:

for each of the different sub-NoC designs in the hierarchical topology, identifying hierarchically distinct flows across a plurality of instances of the each of the different sub-NoC designs through grouping, from the flow list, flow instances associated with each of the plurality of instances of the each of the different sub-NoC designs;

determining a unified route and Virtual Channel (VC) for each of the hierarchically distinct flows; and projecting the unified route and VC back to paths through each of the plurality of instances of the each of the different sub-NoC designs.

6. The non-transitory computer-readable medium of claim 5, wherein determining the unified route and VC for each of the hierarchically distinct flows comprises:

determining a single flow bundle route for a set/bundle of hierarchically distinct flows, wherein the hierarchically distinct flows associated with each traffic class between two or more hosts are grouped into the set/bundle of hierarchically distinct flows; and determining a corresponding VC for each of hierarchically distinct flow in the set/bundle of hierarchically distinct flows.

* * * * *